US 6,553,755 B2

(12) United States Patent
Hofmann et al.

(10) Patent No.: US 6,553,755 B2
(45) Date of Patent: *Apr. 29, 2003

(54) EXPANDED GRID STATIC MIXER

(75) Inventors: Lothar Hofmann, Altenkunstadt (DE); Wieland Mathes, Michelau (DE); Udo Klumpp, Markgraitz (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 10/133,258

(22) Filed: Apr. 25, 2002

(65) Prior Publication Data

US 2002/0116916 A1 Aug. 29, 2002

Related U.S. Application Data

(62) Division of application No. 09/519,384, filed on Mar. 3, 2000, now Pat. No. 6,401,449, which is a continuation of application No. PCT/DE98/02780, filed on Sep. 18, 1998, now abandoned.

(30) Foreign Application Priority Data

Sep. 18, 1997 (DE) .......................... 197 41 199

(51) Int. Cl.[7] ............................... F01N 3/00
(52) U.S. Cl. ................ 60/282; 60/274; 60/286; 60/295; 60/303; 423/238
(58) Field of Search ................ 60/274, 286, 295, 60/296, 299, 300, 297, 309, 324, 303; 423/212, 235, 239.1, 238

(56) References Cited

U.S. PATENT DOCUMENTS

| 4,393,031 A | * | 7/1983 | Henke ..................... 423/239 |
| 4,530,418 A | | 7/1985 | Currie ..................... 181/227 |
| 4,567,630 A | | 2/1986 | Ishida et al. ............. 29/6.2 |

(List continued on next page.)

FOREIGN PATENT DOCUMENTS

| DE | 3208634 | 9/1982 | |
| DE | 4123161 | 1/1983 | |
| DE | 4203807 | 8/1993 | |
| DE | 9308772 | 11/1993 | |
| DE | 0579415 | 1/1994 | |
| DE | 4313393 | 10/1994 | |
| EP | 0046455 | 2/1982 | |
| EP | 0247965 | 12/1987 | |
| GB | 2 161 397 A | * 1/1986 | ................ 60/309 |
| WO | WO9701389 | 1/1997 | |

OTHER PUBLICATIONS

"Begriffe in der Streckgitterverarbettung," Brochure of Ernst Sorst & Co., Hannover, Germany.

"PARMIX for Low–Pressure–Loss Mixing," Order No. A96001–U91–A224–X–7600, Siemens AG, Bereich Energieerzeugung (KWU), Freyeslebenstraβe 1, D–91058 Erlangen, Germany (1993).

"SiNOx Nitrogen Oxide Reduction for Stationary Diesel Engines," Order No. A96001–U91–A232, Siemens AG, Bereich Energieerzeugung (KWU), Freyeslebenstraβe 1, D–91058 Erlangen, Germany (1994).

Internationalen Recherchenbericht (International Search Report) in PCT/DE98/02780, Feb. 11, 1999.

Internationalen Vorläufigen Prüfungsberichts (International Preliminary Examination Report) in PCT/DE98/002780, Jan. 5, 2000.

*Primary Examiner*—Thomas Denion
*Assistant Examiner*—Binh Tran
(74) *Attorney, Agent, or Firm*—David M. Quinlan P.C.

(57) ABSTRACT

A static mixer in the exhaust emission control system of an excess-air-operated combustion engine is formed of an expanded grid with a plurality of openings formed between crossbars. Using an expanded grid achieves both good mixing of the exhaust gas with a reducing agent in a short mixing path and properly aligns the exhaust flow.

11 Claims, 2 Drawing Sheets

U.S. PATENT DOCUMENTS

| | | |
|---|---|---|
| 4,672,809 A | 6/1987 | Cornelison et al. ............ 60/286 |
| 4,719,090 A | 1/1988 | Masaki ........................ 422/310 |
| 4,737,345 A * | 4/1988 | Henke ......................... 422/109 |
| 5,177,961 A | 1/1993 | Whittenberger .............. 60/300 |
| 5,209,062 A | 5/1993 | Vollenweider ................ 60/280 |
| 5,431,893 A | 7/1995 | Hug et al. ................ 423/234.1 |
| 5,489,153 A | 2/1996 | Berner et al. ................ 366/337 |
| 5,542,249 A | 8/1996 | Heath .......................... 60/293 |
| 5,820,832 A | 10/1998 | Hüttenhofer et al. ........ 422/171 |
| 5,941,069 A | 8/1999 | Heath .......................... 60/307 |
| 5,968,464 A | 10/1999 | Peter-Hoblyn et al. ...... 423/235 |
| 6,120,580 A * | 9/2000 | Sander et al. ................... 95/11 |
| 6,203,770 B1 | 3/2001 | Peter-Hoblyn et al. ...... 423/212 |
| 6,302,683 B1 * | 10/2001 | Vestin et al. .................... 431/7 |
| 6,401,449 B1 * | 6/2002 | Hofmann et al. ............. 60/274 |

\* cited by examiner

EXPANDED GRID STATIC MIXER

This application is a division of application Ser. No. 09/519,384 filed Mar. 3, 2000, now U.S. Pat. No. 6,401,449, which is a continuation of International Application PCT/DE98/02780, with an international filing date of Sep. 18, 1998, now abandoned.

BACKGROUND OF THE INVENTION

1. Field of the Invention

The present invention relates to a static mixer for placement in a flow channel and, more particularly, to an expanded grid static mixer for improved mixing of exhaust gases and a reducing agent in an exhaust emission control system of an internal combustion engine.

2. Description of Related Art

The use of a regulated or controlled diesel catalytic converter has proven to be an advantageous technique to reduce pollutants, particularly nitrogen oxides, in the exhaust of an internal combustion engine. This technique is used in particular in internal combustion engines operated with excess air, such as diesel and lean-mix engines. This technique, based essentially on the method of selective catalytic reduction (SCR), brings the nitrogen oxides into contact with a reducing agent on a selective catalyst, which converts them into harmless nitrogen and water.

An exhaust emission control system operating on this principle is discussed in a Siemens Aktiengesellschaft pamphlet entitled "SiNOx Nitrogen Oxide Reduction for Stationary Diesel Engines," Order No. A96001-U91-A232, Siemens AG, Bereich Energieerzeugung (KWU), Freyeslebenstraβe 1, 91058 Erlangen, Germany (1994). Such a system can drastically reduce the nitrogen oxide emissions from a diesel engine. It mixes the nitrogen oxides in the exhaust gas with a reducing agent, usually ammonia obtained from urea by hydrolysis, in the exhaust pipe, and then introduces the mixture into a reactor space with a catalyst device for catalytic conversion. A static mixer, such as that shown in DE 41 23 161 (U.S. Pat. No. 5,489,153), is used for mixing the reducing agent with the exhaust gas.

Known static mixers have proven generally satisfactory in homogeneously mixing reducing agents with the exhaust gas in such exhaust emission control systems. However, the exhaust pipe configuration in a vehicle must be adapted to the vehicle's structural design, and in many applications the minimum mixing path required by known mixers cannot be realized because of lack of space. In such a case, the flow conditions into the catalytic converter may be unfavorable, resulting in an uneven flow profile at the converter inlet.

SUMMARY OF THE INVENTION

It is an object of the present invention to avoid the shortcomings of prior art mixers in such situations.

The present invention relates to a static mixer for placement in the flow channel of an exhaust emission control system, which seeks to provide as short a mixing path as possible and align the flow direction of the exhaust gas in the flow channel.

In furtherance of the objects of the present invention, one aspect of the invention involves an exhaust system for an internal combustion engine having a catalytic converter for reducing pollutants in the exhaust gases from the engine in the presence of a reducing agent, which exhaust system comprises an exhaust duct for carrying the exhaust gases from the engine to the catalytic converter, the exhaust duct having an injection location for the introduction of the reducing agent into the exhaust gases, and a static mixer disposed in the exhaust duct upstream of the catalytic converter and proximate to the injection location, the static mixer comprising an expanded grid in the form of a mesh having a plurality of openings formed between crossbars of said expanded grid.

In accordance with another aspect of the present invention, an excess-air-operated internal combustion engine comprises a catalytic converter for reducing pollutants in the exhaust gases from the engine in the presence of a reducing agent, an exhaust duct for carrying the exhaust gases from the engine to the catalytic converter, an injection device in the exhaust duct for introducing the reducing agent into the exhaust gases upstream of the catalytic converter, and a static mixer disposed in the exhaust duct upstream of the injection device, the static mixer comprising an expanded grid in the form of a mesh having a plurality of openings formed between crossbars of the expanded grid.

Another aspect of the present invention is a method of mixing exhaust gases of an internal combustion engine with a reducing agent, the method comprising providing a static mixer comprising a conventional expanded grid in the form of a mesh having a plurality of openings formed between crossbars of the expanded grid, and placing the static mixer in an exhaust duct of the engine proximate to an injection location for the introduction of the reducing agent into the exhaust gases.

BRIEF DESCRIPTION OF THE DRAWINGS

Exemplary embodiments of the invention are explained in more detail with reference to four figures, in which.

In the drawings, the same components are given the same reference numbers or letters in the different figures.

DETAILED DESCRIPTION OF PREFERRED EMBODIMENTS

Figure 1:
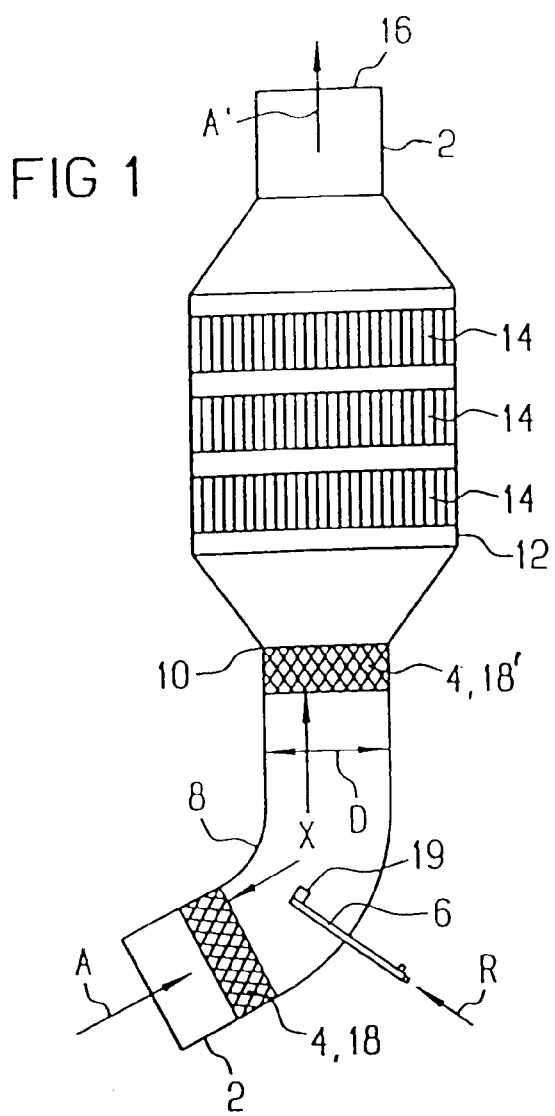
FIG. 1 schematically depicts an exhaust emission control system with SCR catalytic reduction, having static mixers according to the present invention located in an exhaust pipe upstream and downstream of a reducing agent injection location.

FIG. 1 illustrates an exhaust gas A discharged from an excess-air-operated internal combustion engine (not shown). The engine may be a diesel engine with an exhaust turbocharger (not shown) that directs the exhaust gas A into a flow channel formed by an exhaust pipe 2.

The exhaust pipe has therein a first static mixer assembly 18 employing one or more expanded grids 4, discussed in more detail below in connection with FIG. 3. Following in the direction of flow, an injection device 6 for injecting a reducing agent R into the flow is disposed downstream of the first static mixer, at a curved section 8 of the exhaust pipe 2. The reducing agent R may be ammonia ($NH_3$), in particular an aqueous solution of urea. At a transitional point 10, the exhaust pipe 2 widens to form an exhaust-gas catalytic converter compartment 12. A second static mixer assembly 18' is disposed downstream of the injection device 6. The second mixer is located in the exhaust pipe 2 just upstream of the transitional point 10, and therefore upstream of the catalytic converter compartment 12. The second static mixer assembly 18' likewise employs one or more expanded grids 4.

The exhaust-gas catalytic converter compartment 12 is shown as having three SCR catalyst modules 14 arranged one behind the other. It serves in a conventional fashion to eliminate nitrogen oxides (NOx) in the exhaust gas A. An example of a suitable catalytic converter is shown in International Patent Application WO 97/01387, incorporated herein by reference as if set out in full. The cleaned exhaust gas A' exits the exhaust pipe 2 via an outlet 16. FIG. 3 is a perspective view of an embodiment of an expanded grid static mixer according to the present invention.

Figure 2:
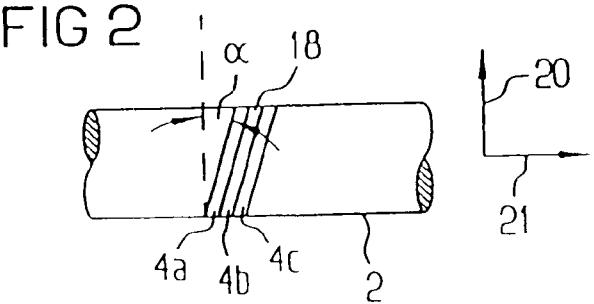
FIG. 2 is a detailed view of an embodiment of one of the static mixers shown in FIG. 1, with a laminated construction in an inclined orientation in the exhaust pipe.

FIG. 2 illustrates in more detail the first static mixer assembly 18 depicted in FIG. 1. The assembly 18 comprises plural static grids 4, in this case three grids 4a, 4b and 4c. They are laminated, that is, they comprise a plurality of expanded grids 4 in series one behind the other, fitted into the exhaust pipe 2.

Each static mixer in FIG. 1 may be one expanded grid 4 or an assembly of plural, laminated expanded grids. In either case, the distance X between the static mixers is preferably less than or equal to five times the diameter D of the exhaust pipe 2.

In comparison with prior art mixers, use of an expanded grid as a static mixer in an exhaust emission control system of this kind has been found to be an improvement both in providing more even distribution of the exhaust gas/reducing agent mixture and better alignment of the flow within the flow channel or exhaust pipe 2.

For instance, when the SINOx exhaust emission control system is used for a commercial vehicle in which the curved section 8 of the exhaust pipe 2 coming from the vehicle engine had to be installed directly ahead of the exhaust-gas catalytic converter compartment 12 on account of the available installation space in the vehicle, it was possible to note an appreciable increase in the NOx conversion brought about by the installation of the expanded grid 4 as a mixer/flow director upstream of the curved section 8. It is believed that this increase in conversion of NOx in comparison with known mixers can be attributed to the effect exerted by the respective expanded grid 4 on the direction of flow therethrough. As is known, a pipe bend such as the curved section 8 leads to the formation of an asymmetrical flow profile at the injection point 19, determined by the position of the injection device 6, as well as at the exhaust-gas catalytic converter compartment 12.

As represented in FIG. 2, one or all of the expanded grids making up a static mixer assembly according to the present invention may be inclined to the transverse direction 20 of the exhaust pipe 2 at an angle of inclination α to the longitudinal axis 21 of the pipe. In this case, the angle of inclination α is preferably between 0° and 45°.

An expanded grid used in the present invention may be made of any suitable material, plastic or metal being typical. A metal grid of the type suitable for use in the present invention is also sometimes referred to as an expanded mesh. An expanded grid of this kind is described, for example, in the company brochure "Strecken macht größer, Streckgitter" ["Expansion Increases Size, Expansion Grids"] of the company Ernst Sorst & Co., Hannover, Germany, and is commercially available in a variety of configurations. DE 32 08 634 C2 (U.S. Pat. No. 4,567,630) discloses a manner of making a suitable expanded mesh sheet, in that instance used as a support for a catalytic substance in a vehicle exhaust system. In connection with the present invention, the terms "expanded grid," "expanded-mesh grid," and the like refer to a mesh formed from a sheet of material by slitting and expanding the sheet, for example, as illustrated in the Ernst Sorst & Co. brochure under the heading "Streckgitter" or as discussed in U.S. Pat. No. 4,567,630 at column 1, lines 18–35, to provide a configuration as shown in FIGS. 3 and 4 hereof. U.S. Pat. No. 4,567,630 and the Ernst Sorst & Co. brochure are incorporated herein by reference as if set out in full.

The individual expanded grids 4a to 4c used within a laminated assembly 18 may also be of different types. For instance, various types of the expanded grids represented in the company brochure mentioned above, such as expanded grids with long crossbars and deformed or pleated expanded grids, may be combined within an exhaust emission control system.

Figure 3:
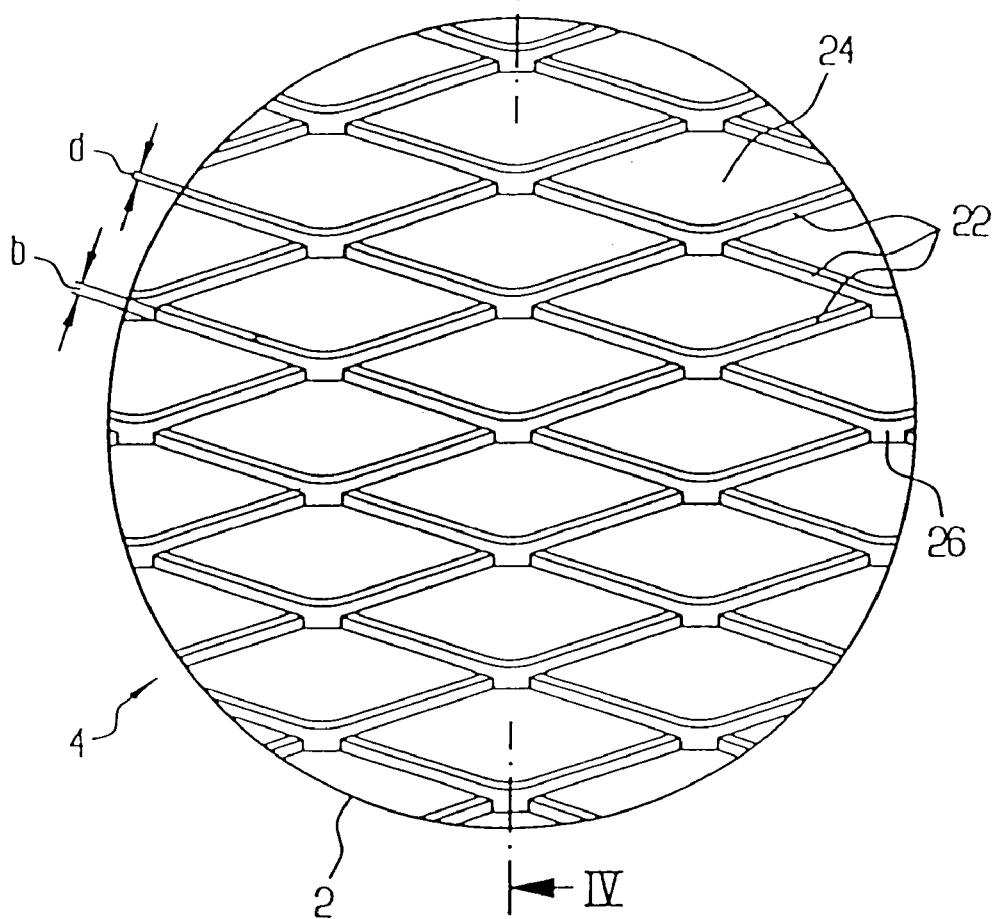
FIG. 3 is a perspective view of an embodiment of an expanded grid static mixer according to the present invention.
Figure 4:
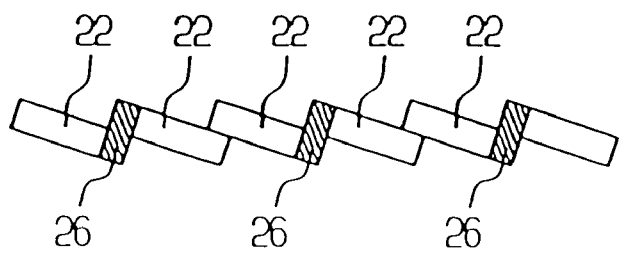
FIG. 4 is a section taken along the line IV—IV in FIG. 3.

As seen in FIGS. 3 and 4, the expanded-mesh grid 4 comprises a matrix of openings 24, which are bounded by crossbars 22 and through which the exhaust gas A flows during operation of the exhaust emission control system. In this case, the effect of the direction of flow is determined essentially by the crossbar width b. The crossbar thickness d, established by the thickness of the material used to make the expanded mesh, and the length and width of the node points 26, formed by four meeting crossbars 22, determine the effect of the mixing. Particularly good mixing and effective direction of flow are obtained with a ratio of the crossbar width b to the crossbar thickness d in the range between 0.5 and 5. The free cross-section, that is, the area of all of the openings 24, should be between 25% and 85% of the total area of the expanded grid 4 (and thus of the cross-sectional area $nD^2/4$ of the exhaust pipe 2).

In accordance with the present invention, the static mixer also functions as a flow director. During the operation of the exhaust system and the exhaust emission control system, a reducing agent introduced into the exhaust emission control system is mixed with the exhaust gas on account of the mixing action generated by the expanded grid. At the same time, the expanded grid aligns the flow at least approximately parallel to the longitudinal axis or axis of symmetry of the exhaust pipe 2. Aided by suitable arrangement of the expanded grid, unfavorable flow profiles within the exhaust pipe, induced in particular as a result of given installation configurations required by vehicle structure, are eliminated, and the flow is made more uniform, all in a particularly simple and effective way.

As noted above, the expanded grid typically fills the entire cross section of the exhaust pipe and about 25% to 85% of the expanded grid is open to the flow. Depending on the application, the expanded grid may be designed with a fine or coarse mesh and as an expanded grid with long crossbars. The expanded grid may be installed normal to the longitudinal axis of the exhaust pipe, or more preferably, at an angle of inclination up to 45°.

When the flow passes around the grid nodes or node points of the expanded grid, vortexes and turbulence are generated to induce mixing. At the same time, the crossbars of the expanded grid align the flow of the exhaust gas, or of the exhaust gas/reducing agent mixture, according to the angle the crossbars present to the flow. With an increasing ratio between the crossbar width and crossbar thickness, an increasing effect on the flow direction is created. With a decreasing ratio, on the other hand, increased mixing is obtained. As mentioned above, a particularly preferred range of the ratio between crossbar width and crossbar thickness has been found to be between 0.5 and 5.

At least one of the expansion grids is advantageously arranged upstream of the reducing agent injection point with respect to the direction of flow of the exhaust gas. This is particularly advantageous if injection takes place within a bend of the exhaust pipe, since more exhaust gas would otherwise occupy the outer region of the exhaust pipe bend than in the inner region. The resultant unfavorable flow conditions in the pipe bend normally lead to the exhaust gas being subjected particularly unevenly to the reducing agent when the latter is sprayed into the exhaust pipe. That unfavorable flow profile is made more uniform by the upstream expanded grid, so that homogeneous mixing of the exhaust gas with the reducing agent is provided even when injection takes place at or near a bend in the exhaust pipe. To make the flow profile even more uniform as the exhaust-gas/reducing-agent mixture enters the reaction space, a second expanded-grid static mixer is expediently provided directly ahead of the catalytic converter.

If a number of expanded grids in a plurality of layers or laminated assemblies are used, the alignment of the expanded grids in relation to one another is performed initially with a view to particularly good mixing of the exhaust gas with the reducing agent. In this case, the last layer downstream also serves for directing the flow according to the following pipe or channel routing. In the case of a plurality of layers, different expanded grids with different mesh openings, crossbar dimensions and/or node dimensions are preferably used.

Use of an expanded grid as a static mixer in the flow channel of an exhaust emission control system of an excess-air-operated combustion engine provides good mixing of the exhaust gas with a reducing agent, even over a particularly short mixing path. In addition, the flow of the exhaust gas and/or exhaust-gas/reducing-agent mixture is made more uniform in a particularly simple way because the expanded grid also serves as a flow director.

Although preferred embodiments of the invention have been depicted and described, it will be understood that various modifications and changes can be made other than those specifically mentioned above without departing from the spirit and scope of the invention, which is defined solely by the claims that follow.

What is claimed is:

1. An exhaust system for an internal combustion engine having a compartment housing a catalytic converter for reducing pollutants in the exhaust gases from the engine in the presence of a reducing agent, the exhaust system comprising:

an exhaust duct for carrying the exhaust gases from the engine to the catalytic converter compartment, said exhaust duct having an injection location for the introduction of the reducing agent into the exhaust gases; and a static mixer disposed in said exhaust duct at a location spaced upstream of the catalytic converter compartment and proximate to said injection location, said static mixer comprising an expanded grid made of at least one sheet that has been slit and expanded to provide a mesh having a plurality of openings formed between crossbars of said expanded grid.

2. The exhaust system of claim 1, wherein said static mixer is disposed upstream of said injection location.

3. The exhaust system of claim 1, wherein said openings comprise between 25% to 85% of a cross-sectional area of said exhaust duct.

4. The exhaust system of claim 1, wherein said expanded grid is inclined at an angle a relative to a transverse direction normal to a longitudinal axis of said exhaust duct, and $0° \leq \alpha \leq 45°$.

5. The exhaust system of claim 1, wherein said crossbars have a width b and a thickness d, and b/d is between 0.5 and 5.

6. The exhaust system of claim 1, wherein said static mixer comprises a plurality of said expanded grids.

7. The exhaust system of claim 6, wherein said plurality of said expanded grids comprise a laminated assembly.

8. An excess-air-operated internal combustion engine comprising:

a catalytic converter for reducing pollutants in the exhaust gases from the engine in the presence of a reducing agent;

an exhaust duct for carrying the exhaust gases from the engine to said catalytic converter, wherein said catalytic converter is housed in a compartment in said exhaust duct;

an injection device in said exhaust duct for introducing the reducing agent into the exhaust gases upstream of said catalytic converter compartment; and a static mixer disposed in said exhaust duct at a location spaced upstream of said injection device, said static mixer comprising an expanded grid made of at least one sheet that has been slit and expanded to provide a mesh having a plurality of openings formed between crossbars of said expanded grid.

9. The internal combustion engine of claim 8, wherein said static mixer comprises a laminated assembly including a plurality of said expanded grids, in each of which said openings comprise between 25% to 85% of a cross-sectional area of said exhaust duct and said crossbars have a width b and a thickness d, and b/d is between 0.5 and 5.

10. The internal combustion engine of claim 9, wherein each said laminated assembly is inclined at an angle a relative to a transverse direction normal to a longitudinal axis of said exhaust duct, and $0° \leq \alpha \leq 45°$.

11. The internal combustion engine of claim 8 wherein said injection device is disposed in a curved section of said exhaust duct and said static mixer is disposed in a straight section of said exhaust duct.

* * * * *